United States Patent [19]

Sanner et al.

[11] Patent Number: 5,559,082
[45] Date of Patent: Sep. 24, 1996

[54] BORATE-STARCH COMPOSITIONS FOR USE IN OIL FIELD AND OTHER INDUSTRIAL APPLICATIONS

[75] Inventors: Todd Sanner, Duncan, Okla.; Adrian P. Kightlinger, Muscatine, Iowa; J. Reagan Davis, Houston, Tex.

[73] Assignee: Grain Processing Corporation, Muscatine, Iowa

[21] Appl. No.: 372,202

[22] Filed: Jan. 13, 1995

[51] Int. Cl.$^6$ ............................ E21B 43/267; E21B 43/26
[52] U.S. Cl. ...................... 507/273; 166/308; 166/300; 166/294; 507/922; 507/277; 507/111; 507/212
[58] Field of Search .................................. 507/273, 277, 507/111, 212

[56] References Cited

U.S. PATENT DOCUMENTS

| | | | |
|---|---|---|---|
| 4,619,776 | 10/1986 | Mondshine | 252/8.551 |
| 5,082,579 | 1/1992 | Dawson | 252/8.551 |
| 5,145,590 | 9/1992 | Dawson | 252/8.551 |
| 5,160,643 | 11/1992 | Dawson | 252/8.551 |
| 5,266,224 | 11/1993 | Sharif | 507/273 |
| 5,362,408 | 11/1994 | Pakulski et al. | 252/8.551 |
| 5,445,223 | 8/1995 | Nelson et al. | 507/273 |

FOREIGN PATENT DOCUMENTS

| | | |
|---|---|---|
| 0594363 | 4/1994 | European Pat. Off. . |
| 0594364 | 4/1994 | European Pat. Off. . |

*Primary Examiner*—David B. Springer
*Attorney, Agent, or Firm*—Leydig, Voit & Mayer, Ltd.

[57] ABSTRACT

Borated starch compositions useful for controlling the rate of crosslinking of hydratable polymers in aqueous media for use in drilling fluids.

18 Claims, No Drawings

BORATE-STARCH COMPOSITIONS FOR USE IN OIL FIELD AND OTHER INDUSTRIAL APPLICATIONS

This invention relates to controlling the rate of crosslinking of hydratable polymers.

Hydratable polymers which are capable of gelling in the presence of borate ions to form a gelled fluid are known. Such hydratable polymers include, for example, galactomannan gums, glucomannan gums, cellulose derivatives, guars and derivatized guars such as guar gum, guar gum derivatives, locust bean gum, karaya gum, carboxymethyl cellulose, carboxymethylhydroxyethyl cellulose and hydroxyethyl cellulose and the like.

Such hydratable polymers have found advantageous use in fracturing fluids to stimulate production from oil and gas wells. Hydraulic well fracturing is a process employed to create a highly permeable flow channel in a subterranean formation or fluid reservoir. A viscous fracturing fluid carrying a propping agent is pumped at high pressure into a well bore. The high pressure fracturing fluid contacts the formation, and when natural reservoir pressures are exceeded, initiates a fracture in the formation. High pressure pumping continues in order to extend the fracture further into the formation. When the fracturing treatment is complete and pumping has ceased, the propping agent, which was transported into the fracture by the fracturing fluid, prevents closure of the fracture. Various fracturing fluids and propping agents are well known in the art. Generally the fracturing fluid is water based.

Important functions of a fracturing fluid include fracture initiation and propagation and transport of a propping agent. Viscosity is therefore an important characteristic of fracturing fluids which affects fracture length and width. Viscosity is usually generated by hydrating a suitable hydratable polymer which is incorporated in an aqueous based fracturing fluid. Many polymers have been used as viscosifiers for aqueous based fracturing fluids including polyacrylamides and partially hydrolyzed polyacrylamides and various polysaccharide polymers such as guar gum, guar gum derivatives and cellulose derivatives. However, guar gum and guar gum derivatives are the most widely employed viscosifiers for aqueous based fracturing fluids. Crosslinking agents are employed to significantly increase fracturing fluid viscosity. Aluminum, antimony, zirconium, titanium and boron containing compounds crosslink the hydrated polymer chains with a resultant increase in viscosity of the fluid.

It is generally desirable to crosslink the fracturing fluid just prior to or upon entering the subterranean fracture. Within the fracture, fluid flow becomes laminar. Maximum viscosity is required in the fracture for transport of a propping agent and support and creation of the desired fracture geometry. Premature crosslinking of the fracturing fluid on the surface or in the pipe string causes excessive friction pressures and limits the pumping rate of the fluid which affects fracture geometry. In addition, recent investigations indicate that the high sheer encountered in the pipe string causes extensive degradation of the crosslinked fracturing fluid. Therefore, employing an agent which delays the crosslinking of the polymer reduces friction pressures, allows a higher pumping rate and enhances fluid stability. In the case of the metal ion cross-linking systems, the delay has been achieved with an additive that binds or chelates the metal ions in solution.

Recently, guar and guar derivatives crosslinked with borate ions have become popular as components of fracturing fluids. In alkaline water having a pH greater than about 8, crosslinking of the guar polymer is essentially instantaneous. This is most likely due to the fact that borates easily and readily esterify with 1,2-cissoidal dialcohols or polyhydric alcohols such as those found in the guar polymer. However, this esterification is readily reversible, especially at higher temperatures found in the well bore, so that free borate ion is always available. As a result, the delay in crosslinking by borate ion crosslinking agents is difficult to achieve. The current popularity of borate crosslinked fracturing fluids has stimulated the search for compositions capable of delayed borate ion delivery.

Certain of the prior art borated guar fracturing fluid systems have employed either slow dissolving metal oxides which slowly increase the fluid alkalinity, which in turn promotes crosslinking, or use calcium borate salts having poor water solubility, relying upon the slow dissolution of borate ions for delay. U.S. Pat. No. 4,619,776 issued to Mondshine is typical of the prior art in teaching the use of a sparingly soluble borate to achieve some degree of control over the crosslinking reaction. U.S. Pat. No. 5,082,579 discloses a delayed borate crosslinker comprising a borate which is chemically bound to an aldehyde delay additive. The hydrated polymer must compete with the delay additive for borate ions.

An object of the present invention is to provide compositions which provide control over the crosslinking reaction of a hydratable polymer.

Another object of the invention is to provide compositions which provide selective adjustment of the delay rate of crosslinking of a hydratable polymer in an aqueous fracturing fluid at a well site quickly and conveniently.

Another object of the invention is to provide improved compositions which when used in relatively low amounts provide a high concentration of borate ions in an aqueous medium.

Another object of the invention is to provide compositions capable of providing borate ions in aqueous fracturing fluids containing a hydratable polymer at low temperatures.

A further object of the invention is to provide compositions capable of providing delayed crosslinking of hydratable polymers in aqueous fracturing fluids at low temperatures.

It has now been found that the above objects are achieved by a composition comprising borated starch which controls the rate of crosslinking of hydratable polymers in an aqueous medium. The borated starch compositions are prepared by reacting in aqueous medium starch and a borate source to form a borated starch complex which, in the presence of an aqueous fluid such as water based hydraulic fracturing fluid, provides a source of borate ions which effect crosslinking of hydratable polymers to increase viscosity of the fluid. Generally, in preparing the borate starch composition from about 2 to 25 parts of water to 1 part of starch are employed, and preferably about 5 to 15 parts of water to 1 part of starch are employed in the reaction medium.

It is preferred to conduct the reaction of the boron compound with the starch at an alkaline pH. To this end, there can be incorporated in the reaction mixture an alkaline material, such as alkaline earth metal hydroxides, carbonates and bicarbonates. Preferred are the alkali metal hydroxides.

Preferably, but not necessarily, the reaction of starch with a boron compound providing a source of borate ion is conducted at an elevated temperature on the order of 40° to 120° C. The borate source compound and starch are permitted to react until a gel is formed, which generally occurs within a period of 0.25 to 1.0 hour. The amount of starch to react with a source of borate can vary widely. Most useful ratios of borate calculated as $B_2O_3$ to starch ranges from about 5:95 to 50:50% by weight and most preferred are ratios in the range of about 30:70 to 40:60% by weight.

After the starch-borate gel is formed it can be dried and pulverized or ground to a desired particle size. Drying of the starch-borate gel can be accomplished in various manners, such as by oven or spray drying.

A particularly preferred manner of producing the starch-borate complex of the invention is by extruding a mixture of starch, borate ion source and an alkaline material using a heated extruder.

The starch-borate complex can be added to aqueous fracturing fluids in the form of dry particles or, if desired, the starch-borate complex can be suspended in a non-solvent liquid carrier such as, for example, an oil such as diesel fuel, kerosene, mineral oil and other liquid aliphatic or aromatic hydrocarbons which are not solvents for the starch-boron complex.

The starch employed to form the compositions of this invention is substantially water-insoluble and can be derived from corn, wheat, potato, rice, soy and tapioca. Starch derived from dent corn is the most preferred because of availability. The starch can be a native (natural) or a substantially water-insoluble modified starch such as derivatized starch and a native or derivatized pregelatinized starch. Most preferred are native cooked-up starches. Blends of natural starches and substantially water-insoluble modified starches can be utilized.

Boron sources for reaction with the starch include but are not limited to the alkali and the alkaline earth metal borates and boric acid. Preferred boron compounds are boric acid, boric acid anhydride, sodium borate decahydrate and disodium octaborate tetrahydrate.

Optionally, a surfactant can be incorporated with the borated starch to aid its dispersion in aqueous fluids. The surfactant can be applied as a mixture with or as a coating on the borated starch particles. Representative surfactants include ethoxylated nonyl or octylphenols, ethoxylated butanol, sorbitan monooleate or blends of these or the like. Surfactants suitable for preparing a suspension of the borated starch in oil include, for example, ethoxylated nonyl and octylphenols, quaternary ammonium halides, alkylnaphthalene sulfonates, alkyl imidazolines, alkyl aryl sulfonates and hydroxyethyl alkyl imidazolines. Preferred are the alkyl imidazolines.

Control of the rate of crosslinking of a hydratable polymer in an aqueous medium using the present invention can be accomplished by a variety of methods. By varying the ratio of borate ($B_2O_3$) to starch and alkalinity a product can be manufactured to provide a specific crosslink delay time. Another method involves varying the grind size of a borate-starch composition to provide a product with specific crosslink delay times. Another method involves varying the pH of the aqueous fracturing fluid from about 8.5 to 12.5. Another method involves varying the amount of the borated starch complex in relation to the amount of hydratable polymer from about 0.025 pound to 0.100 pound $B_2O_3$ equivalent per pound of hydratable polymer. The delay in desired crosslinking can be routinely determined taking into consideration the fracturing fluid temperature, particle size of the borated starch complex and pH of the fracturing fluids.

The invention and the advantages thereof will be further apparent from the following examples:

EXAMPLE 1

Ten parts of disodium octaborate tetrahydrate was dissolved in 100 parts of water and 10 parts of dent starch dispersed into the solution. The dispersion was poured into a glass container and placed into a 115° C. oven for six hours to dry the gel which formed. After drying, the product was ground into small particles.

EXAMPLE 2

Twenty-five parts of a dry pregelatinized starch was dispersed in 350 parts of water. The dispersion was stirred while adding 25 parts disodium octaborate tetrahydrate. The resulting gel was spread onto a metal sheet and dried in an oven at 100°–110° C. for approximately 6 hours. After drying, the product was ground into small particles.

EXAMPLE 3

Twenty parts of a starch hydrolyzate having a dextrose equivalent value of 27 were added to 100 parts of water. Then 20 parts of disodium octaborate tetrahydrate were added to the starch hydrolyzate (maltodextrin) solution. The solution was stirred, spread onto a metal sheet and dried in an oven at 100°–110° C. for approximately 6 hours. After drying, the product was ground into small particles.

EXAMPLE 4

Ten parts of corn starch was dispersed in 300 parts of water. The dispersion was stirred, heated to 85° C., and held at that temperature for 45 minutes. After 45 minutes, the starch solution was removed from the heat and 10 parts disodium octaborate tetrahydrate added with stirring. The resulting gel was spread onto a metal sheet and dried in an oven at 100°–110° C. for approximately 6 hours. After drying, the product was ground into small particles.

EXAMPLE 5

Ten parts starch were dispersed in 300 parts of water. The dispersion was stirred, heated to 85° C., and held at that temperature for 45 minutes. After 45 minutes, the starch solution was removed from the heat and 3.3 parts disodium octaborate tetrahydrate added with stirring. The resulting gel was spread onto a metal sheet and dried in an oven at 100°–110° C. for approximately 6 hours. After drying, the product was ground into small particles.

EXAMPLE 6

Ten parts starch were dispersed in 300 parts of water. To the aqueous starch dispersion 0.3 parts of sodium hydroxide pellets were added. The dispersion was stirred, heated to 85° C., and held at that temperature for 45 minutes. After 45 minutes, the starch solution was removed from the heat and 3.3 parts disodium octaborate tetrahydrate added with stirring. The resulting gel was spread onto a metal sheet and dried in an oven at 100°–110° C. for approximately 6 hours. After drying, the product was ground into small particles.

EXAMPLE 7

A well fracturing base fluid was prepared by hydrating hydroxypropylated guar gum (0.48% by weight) in water. Sodium carbonate and sodium bicarbonate were used to adjust the pH of the base fluid to 10.5. Various crosslinking agents were tested by adding them to the base fracturing fluid at the rate of 0.9 kilograms per 1000 liters of the base fracturing fluid. Crosslink times were determined by stirring the base fracturing fluid in a Waring blender, adding the crosslinking agent and measuring the time required for the gel to crosslink. The blender used a 500 milliliter cup and a 1⅞ inch blade at about 40 volts so that a vortex was created, 200 milliliter aliquots of the base fracturing fluid were tested. The base fracturing fluid was considered crosslinked when the vortex in the fluid completely closed and the surface of the fluid was flat and not rotating. The test temperature was 21° C. unless otherwise noted. Each crosslink time test was repeated two to five times and an average calculated. The crosslinking times of tested compositions were:

| Crosslinking Agent | Crosslink Time, minutes |
| --- | --- |
| Disodium octaborate tetrahydrate alone | 0.25 |
| Borated pregelatinized starch (Example 2) | 2.01 |
| Borated Starch Hydrolyzate (Example 3) | 0.60 |
| Borated corn starch (Example 4) | 1.60 |

The above data illustrate the increase in delay of crosslinking by use of compositions of the invention.

EXAMPLE 8

A base fracturing fluid was prepared according to Example 7. The borated starch compositions of Example 5 and Example 6 were added at 1.8 kilograms per 1000 liters of base fluid and tested as in Example 7. The test temperature was 21° C.

| Composition | Wt. % Alkali (D.S.B.) | Crosslink Time, minutes |
| --- | --- | --- |
| Example 5 | 0 | 1.85 |
| Example 6 | 0.3 | 2.18 |

The data indicate that preparation of the borated starch at an alkaline pH increases delay in crosslinking time.

EXAMPLE 9

A borated starch composition was prepared according to the present invention. The composition was ground to provide various particle sizes using a laboratory mill. Three samples were then tested to determine the effect of borated starch particle size on the crosslinking time of a fracturing fluid. The base fracturing fluid was prepared by hydrating hydroxy-propylated guar gum (0.36% by weight) in water. A solution of potassium carbonate was used to raise the pH of the fluid to 10.5. The concentration of the samples were adjusted to provide the equivalent of 0.3 kilograms $B_2O_3$ per 1000 liters of the base fluid. Crosslink times were determined by stirring the hydrated base fluid in a Waring blender, adding the crosslinking agent and measuring the time required for crosslinking. The blender used a 500 milliliter cup and a 1⅞ inch blade at about 40 volts so that a vortex was created. Two hundred milliliter aliquots of the base fracturing fluid were tested. The fluid was considered crosslinked when the vortex in the fluid completely closed and the surface of the fluid was flat and not rotating. The test temperature was 21° C. Each crosslink time test was repeated two to five times and an average was calculated.

| Borated Starch | Wt. % Retained on U.S. 80 | Crosslink Time, Minutes |
| --- | --- | --- |
| Sample 1 | 73.5 | 6.25 |
| Sample 2 | 36.5 | 3.50 |
| Sample 3 | 8.9 | 2.50 |

EXAMPLE 10

A borated starch composition was prepared according to the present invention. The composition was ground then dispersed and suspended in diesel fuel. The crosslink time of the slurried composition was tested according to the procedure of Example 9. The composition was used to provide the equivalent of 0.3 kilograms $B_2O_3$ per 1000 liters of fuel.

| Test Temperature, °C. | Crosslink Time, minutes |
| --- | --- |
| 15.6 | 3.30 |
| 21.0 | 2.30 |
| 26.7 | 1,60 |

This example illustrates the effect of temperature on the crosslink delay time.

EXAMPLE 11

A borated starch composition was prepared according to the present invention. The composition was ground then dispersed and suspended in diesel fuel. The crosslink time of the slurried composition was tested according to the procedure of Example 9. The composition was used to provide the equivalent of 0.24 kilogram $B_2O_3$ per 1000 liters.

| Frac Fluid pH | Crosslink Time, minutes |
| --- | --- |
| 9.5 | 2:30 |
| 10.0 | 2:08 |
| 10.5 | 3:00 |
| 11.0 | 5:50 |
| 11.5 | 9:00 |

This example illustrates the effect of the fracturing fluid pH on the crosslink delay time.

EXAMPLE 12

This example illustrates the use of a twin screw extruder for preparing a borated starch product of the present invention. The extruder used was a Wenger TX-80 (Wenger Mfg. Co., Sebetha, Kan.). Extruder conditions were as follows:

| | |
| --- | --- |
| Screw, rpm | 350 |
| Barrel Temp., °C. | |
| a. Zones 1–5 | a. 100–105 |
| b. Cone | b. 135 |
| c. Die | c. 105 |

The following ingredients were fed into the extruder at the feed rates indicated:

| Ingredient | Feed Rate (lb./hr.) |
| --- | --- |
| Starch/Polybor (1:1) | 880 |
| NaOH (50% | 145 |
| $H_2O$ + Steam | 271 |

The extruded product was dried in a single Wenger Series VI drier with the heating zone set at 145°, 150° and 150° C. and a total residence time of approximately 12 minutes. After drying the product was ground using a Fitz mill set at a fine setting.

Those modifications and equivalents which fall within the spirit of the invention are to be considered a part thereof.

What is claimed is:

1. A composition useful for controlling the cross-linking rate of a hydratable polymer in the presence of borate ions which comprises a starch borate complex.

2. A composition in accordance with claim 1 wherein a substantially water-insoluble starch forms the complex.

3. A composition in accordance with claim 1 wherein native starch forms the complex.

4. A composition in accordance with claim 1 wherein a substantially water-insoluble pregelatinized starch forms the complex.

5. A composition in accordance with claim 1 in dry form.

6. A composition in accordance with claim 1 which contains a surfactant.

7. A process for producing a composition useful for controlling the rate of crosslinking of a hydratable polymer which comprises reacting in aqueous medium starch with a source of borate ion to form a starch-borate complex, and recovering in substantially dry form a starch-borate composition.

8. A process in accordance with claim 7 wherein a substantially water-insoluble starch forms the complex.

9. A process in accordance with claim 7 wherein the starch is a native starch.

10. A process in accordance with claim 7 wherein the starch is a substantially water-insoluble pregelatinized starch.

11. A process in accordance with claim 7 wherein the source of borate ion is disodium octaborate tetrahydrate.

12. A process in accordance with claim 7 wherein the reaction is conducted at an alkaline pH.

13. A process in accordance with claim 7 wherein the reaction is conducted at an elevated temperature.

14. A process in accordance with claim 7 wherein the starch-borate complex is dried and broken into particles.

15. A process in accordance with claim 7 wherein a surfactant is incorporated with the starch-borate complex.

16. A process in accordance with claim 7 wherein the starch-borate complex is prepared by extrusion of starch and source of borate ion at an alkaline pH in a heated extruder.

17. A composition useful for fracturing a subterranean formation comprising an aqueous medium containing a hydratable polymer and a starch borate complex.

18. A composition in accordance with claim 17 wherein the hydratable polymer is guar gum or a derivatized guar gum.

* * * * *